US012166294B2

(12) United States Patent
Kakuya et al.

(10) Patent No.: US 12,166,294 B2
(45) Date of Patent: Dec. 10, 2024

(54) ANTENNA DEVICE

(71) Applicant: DENSO CORPORATION, Kariya (JP)

(72) Inventors: Yuuji Kakuya, Nisshin (JP); Kenichirou Sanji, Kariya (JP)

(73) Assignee: DENSO CORPORATION, Kariya (JP)

( * ) Notice: Subject to any disclaimer, the term of this patent is extended or adjusted under 35 U.S.C. 154(b) by 144 days.

(21) Appl. No.: 18/158,862

(22) Filed: Jan. 24, 2023

(65) Prior Publication Data

US 2023/0163472 A1 May 25, 2023

Related U.S. Application Data

(63) Continuation of application No. PCT/JP2021/028240, filed on Jul. 30, 2021.

(30) Foreign Application Priority Data

Aug. 17, 2020 (JP) ................................ 2020-137616

(51) Int. Cl.
*H01Q 1/38* (2006.01)
*H01Q 1/48* (2006.01)
*H01Q 9/04* (2006.01)

(52) U.S. Cl.
CPC ............ *H01Q 9/0421* (2013.01); *H01Q 1/48* (2013.01)

(58) Field of Classification Search
CPC .......... H01Q 1/32; H01Q 1/3208; H01Q 1/38; H01Q 1/48; H01Q 23/00; H01Q 9/04; H01Q 9/0421
See application file for complete search history.

(56) References Cited

U.S. PATENT DOCUMENTS

| | | | | |
|---|---|---|---|---|
| 5,786,793 A * | 7/1998 | Maeda | H01Q 21/0075 343/846 |
| 10,727,589 B2 * | 7/2020 | Ikeda | H01Q 5/328 |
| 10,879,611 B2 * | 12/2020 | Sugimoto | H01Q 9/0407 |
| 11,271,310 B2 * | 3/2022 | Kakuya | H01Q 1/48 |
| 2010/0289619 A1 | 11/2010 | Kosugi et al. | |
| 2018/0301798 A1 | 10/2018 | Ikeda et al. | |

FOREIGN PATENT DOCUMENTS

| | | |
|---|---|---|
| JP | 2005-027134 A | 1/2005 |
| JP | 4992762 B2 | 8/2012 |
| JP | 5341611 B2 | 11/2013 |
| JP | 2016-111655 A | 6/2016 |

* cited by examiner

*Primary Examiner* — Tho G Phan
(74) *Attorney, Agent, or Firm* — Harness, Dickey & Pierce, P.L.C.

(57) ABSTRACT

An antenna device includes a ground plate made of a flat conductor member, and an opposing conductive plate, which is a flat conductor member placed at a predetermined distance from the ground plate and electrically connected to a power supply line, a short-circuit portion provided in a central region of the opposing conductive plate for electrically connecting the opposing conductive plate and the ground plate. An operating frequency is a frequency at which an inductance of the short-circuit portion and the capacitance formed by the ground plate and the opposing conductive plate resonate in parallel. The short-circuit portion has a perimeter part that is short-circuited with the opposing conductive plate. A circuit is arranged in an area surrounded by a part where a short-circuit portion is short-circuited on the opposing conductive plate.

7 Claims, 3 Drawing Sheets

ANTENNA DEVICE

CROSS-REFERENCE TO RELATED APPLICATIONS

The present application is a continuation application of International Patent Application No. PCT/JP2021/028240 filed on Jul. 30, 2021, which designated the U.S. and claims the benefit of priority from Japanese Patent Application No. 2020-137616 filed in Japan filed on Aug. 17, 2020, the entire disclosure of the above application is incorporated herein by reference.

TECHNICAL FIELD

The present disclosure relates to an antenna device using 0th-order resonance.

BACKGROUND

The antenna device includes a ground plate, which is a conductive plate that has a ground potential, separately from a radiating element.

SUMMARY

An antenna device for achieving the purpose includes a ground plate made of a conductor with a flat plate shape, an opposing conductive plate made of another conductor with a flat plate shape, arranged to space apart from the ground plate by a predetermined distance, and electrically connected to a power supply line, and a short-circuit portion arranged in a central region of the opposing conductive plate and electrically connecting the opposing conductive plate and the ground plate. The antenna device has an operating frequency at which an inductance of the short-circuit portion and a capacitance formed by the ground plate and the opposing conductive plate resonate in parallel. The short-circuit portion has a perimeter portion that is short-circuited with the opposing conductive plate. A circuit is arranged in an area surrounded by short-circuit portion on the opposing conductive plate.

DETAILED DESCRIPTION

Figure 1:
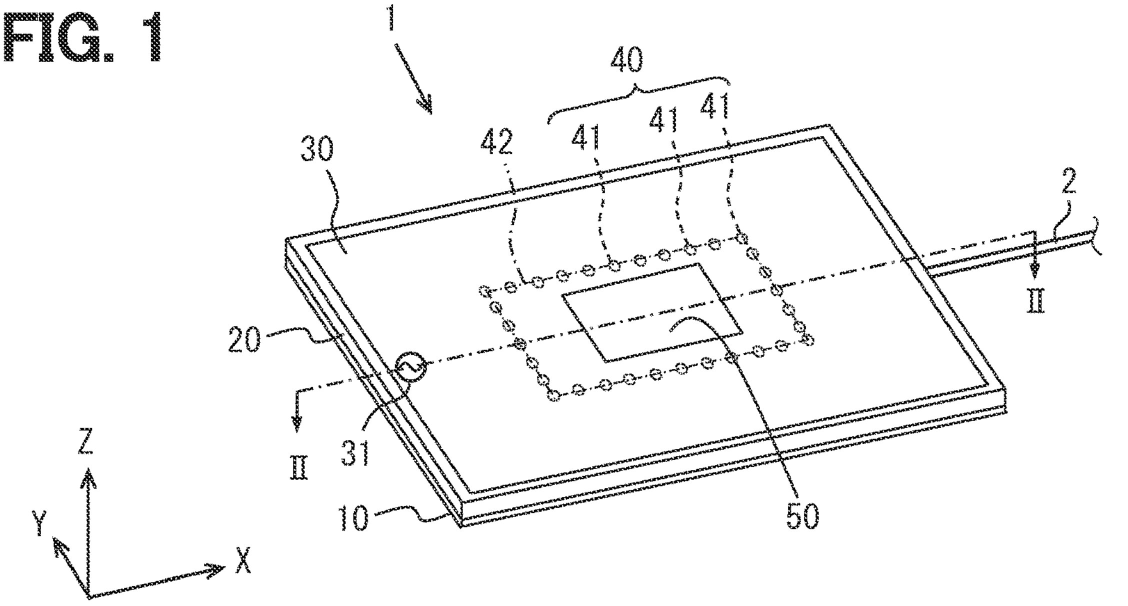
FIG. 1 is an external perspective view of an antenna device 1.

In an assumable example, an antenna device includes a ground plate, which is a conductive plate that has a ground potential, separately from a radiating element. If an area of the ground plate is insufficient for a wavelength of radio waves to be transmitted and received, there is a risk that the current leaking from the ground plate to a cable (hereinafter referred to as "leakage current") will increase. If a leakage current flows through the cable, a gain may decrease or a directivity may become unstable.

As a technique related to such a problem, a technique of forming the ground plate with a printed circuit board and forming a quarter-wave strip line on the ground plate is disclosed.

As an antenna device using 0th-order resonance, there is the antenna device including a flat plate-shaped ground plate that functions as a ground, a flat plate-shaped opposing conductive plate arranged so as to face the ground plate and provided with a feeding point at an arbitrary position, and a short-circuit portion that electrically connects the ground plate and the opposing conductive plate.

The antenna device may include a circuit for the purpose of controlling radio waves radiated from an antenna element. The circuit requires a ground. In the antenna device using 0th-order resonance, it is conceivable to enlarge the ground plate for the circuit.

However, if the ground plate expands and the length of the ground plate approaches the length that resonates at the frequency (hereinafter referred to as the operating frequency) of radio waves emitted by the antenna device, there is a risk that leakage current may increase. In order to suppress leakage current from flowing through the cable, it is conceivable to provide the strip line for leakage current suppression. However, if the strip line for suppressing leakage current is provided, since an area for arranging the strip line is required, there is a problem that the area for arranging circuit elements is reduced.

The present disclosure has been made based on this situation, and is to provide an antenna device using 0th-order resonance, which can suppress leakage current to the cable without providing a strip line.

An antenna device for achieving the purpose includes a ground plate made of a conductor with a flat plate shape, an opposing conductive plate made of another conductor with a flat plate shape, arranged to space apart from the ground plate by a predetermined distance, and electrically connected to a power supply line, and a short-circuit portion arranged in a central region of the opposing conductive plate and electrically connecting the opposing conductive plate and the ground plate. The antenna device has an operating frequency at which an inductance of the short-circuit portion and a capacitance formed by the ground plate and the opposing conductive plate resonate in parallel. The short-circuit portion has a perimeter portion that is short-circuited with the opposing conductive plate. A circuit is arranged in an area surrounded by short-circuit portion on the opposing conductive plate.

In the antenna device, the opposing conductive plate has an area surrounded by a part where the short-circuit portion is short-circuited. The opposing conductive plate is electrically connected to a feeder line, but since it is difficult for current to flow inside the area surrounded by the part where the short-circuited portion is short-circuited, this part can be used as a ground for the circuit. Therefore, in the antenna device, the circuit is arranged in the area surrounded by the part where the short-circuited portion is short-circuited on the opposing conductive plate.

Since the opposing conductive plate is used as the ground for the circuit, there is no need to increase the part that does not face the opposing conductive plate by enlarging the ground plate for the circuit Therefore, it is possible to prevent the length of the portion of the ground plate through which current flows from becoming close to the length that resonates at the operating frequency. As a result, no strip line is required to suppress leakage current from the ground plate.

First Embodiment

Hereinafter, embodiments of the present disclosure will be described with reference to the drawings. In the following, members having the same function will be assigned the same reference numeral, and the descriptions thereof will be omitted. When only a portion of a structure is described, the structures according to the aforementioned embodiments can be applied to the other portion thereof.

FIG. 1 is an exterior perspective view illustrating a schematic structure of an antenna device 1 according to a first embodiment. The antenna device 1 is used by being mounted on a moving body such as a vehicle.

The antenna device 1 is configured to transmit and receive a radio wave having a predetermined operating frequency. Of course, as another aspect, the antenna device 1 may be used for only one of transmission and reception. Since transmission and reception of radio waves are reversible, a configuration capable of transmitting radio waves at a predetermined frequency is also similar to a configuration capable of receiving radio waves at the predetermined frequency.

Herein, the operating frequency shall be 2.45 GHz as an example. Of course, the operating frequency may be appropriately designed, and target frequencies may be, for example, 300 MHZ, 760 MHZ, 850 MHZ, 900 MHZ, 1.17 GHZ, 1.28 GHZ, 1.55 GHZ, 5.9 GHZ, or the like. The antenna device 1 can transmit and receive not only the operating frequency but also radio waves having a frequency within a predetermined range determined with the operating frequency as a reference. For example, the antenna device 1 is configured to be capable of transmitting and receiving frequencies belonging to the band from 2400 MHz to 2500 MHz (hereinafter, 2.4 GHz band).

That is, the antenna device 1 can transmit and receive radio waves in frequency bands used in short-range wireless communication such as Bluetooth Low Energy (Bluetooth is a registered trademark), Wi-Fi (registered trademark), ZigBee (registered trademark), and the like. In other words, the antenna device 1 is configured to be able to transmit and receive radio waves in the frequency band (so-called ISM band) specified by the International Telecommunication Union for general use in the industrial, scientific, and medical fields.

The antenna device 1 is connected via a cable 2 to a communication ECU (Electronic Control Unit) mounted on the vehicle, and signals received by the antenna device 1 are sequentially output to the communication ECU. Also, the antenna device 1 converts an electric signal input from the communication ECU into a radio wave and radiates the radio wave into space. The communication ECU uses signals received by the antenna device 1, and also supplies high-frequency power corresponding to transmission signals to the antenna device 1.

As shown in FIG. 1, the antenna device 1 includes a ground plate 10, a support plate 20, an opposing conductive plate 30, and a short-circuit portion 40. For convenience, each part will be described below with the side where the opposing conductive plate 30 is provided with respect to the ground plate 10 as the upper side for the antenna device 1. That is, the direction from the ground plate 10 to the opposing conductive plate 30 corresponds to the upward direction for the antenna device 1. The direction from the opposing conductive plate 30 toward the ground plate 10 corresponds to the downward direction for the antenna device 1.

The ground plate 10 is a conductive member having a plate shape and made of conductor such as copper. The ground plate 10 is provided along the lower side surface of the support plate 20. The plate shape here also includes a thin film shape such as a metal foil. That is, the ground plate 10 may be a pattern formed on the surface of a resin plate such as a printed wiring board by electroplating or the like. The ground plate 10 may also be realized using conductor layers arranged inside a multilayer substrate including a plurality of conductor layers and insulating layers. The ground plate 10 provides a ground potential in the antenna device 1. The ground plate 10 provides a ground potential by electrically connecting, for example, an external conductor of a coaxial cable. In the following, unless otherwise specified, the connection means an electrical connection.

The ground plate 10 is formed in a rectangular shape. The X-axis shown in various drawings such as FIG. 1 represents the longitudinal direction of the ground plate 10, the Y-axis represents the lateral direction of the ground plate 10, and the Z-axis represents the vertical direction of the ground plate 10. A three-dimensional coordinate system including the X axis, the Y axis, and the Z axis is a concept for describing the configuration of the antenna device 1.

The ground plate 10 should be at least larger than the opposing conductive plate 30. The dimensions of the ground plate 10 can be changed as appropriate. The length of one side of the ground plate 10 may be set to a value electrically smaller than one wavelength (for example, ⅓ of an operating wavelength). The operating wavelength is the wavelength of radio waves emitted by the antenna device 1.

Further, the shape of the ground plate 10 viewed from above (hereinafter referred to as a planar shape) may be appropriately changed. Here, as an example, the plane shape of the ground plate 10 is a rectangular shape, alternatively, as another aspect, the plane shape of the ground plate 10 may be a square shape. When the ground plate 10 has a square shape, the direction along any one side can be the X-axis. Also, the shape of the ground plate 10 may be another polygonal shape. For example, the ground plate 10 may have a square shape in which one side is electrically set to a value corresponding to one wavelength. Rectangular shapes include rectangle and square.

The support plate 20 is a plate-shaped member for arranging the ground plate 10 and the opposing conductive plate 30 so as to face each other at a predetermined interval. The support plate 20 has a rectangular flat plate shape, and a size of the support plate 20 is substantially the same as a size of the ground plate 10 in a plan view. The support plate 20 is realized by using a dielectric material having a predetermined relative permittivity, such as glass epoxy resin. Here, as an example, the support plate 20 is realized by using a glass epoxy resin having a relative permittivity of 4.3.

By adjusting the thickness of the support plate 20, the distance between the opposing conductive plate 30 and the ground plate 10 can be adjusted. The specific value of the thickness of the support plate 20 may be appropriately determined by simulations or experiments.

The thickness of the support plate 20 also serves as a parameter for adjusting the length of the short-circuit portion 40, as will be described later. In other words, the thickness of the support plate 20 functions as a parameter for adjusting the inductance provided by the short-circuit portion 40. In addition, the thickness of the support plate 20 also serves as a parameter for adjusting the capacitance formed by the ground plate 10 and the opposing conductive plate 30 facing each other.

The support plate 20 may fulfill the above-mentioned function, and the shape of the support plate 20 can be changed as appropriate. A configuration for disposing the opposing conductive plate 30 to face the ground plate 10 may be a plurality of columns. Further, in the present embodiment, a configuration in which a resin as a support plate 20 is filled is adopted between the ground plate 10 and the opposing conductive plate 30, alternatively, the present embodiment may not be limited to this. The space between the ground plate 10 and the opposing conductive plate 30 may be hollow or vacuum. The support plate 20 may have a honeycomb structure, for example. In addition, the structures exemplified above may be combined. When the antenna device 1 is realized using a printed wiring board, a plurality of conductor layers included in the printed wiring board may be used as the ground plate 10 and the opposing conductive plate 30, and a resin layer separating the conductor layers may be used as the support plate 20.

The opposing conductive plate 30 is a conductive member having a plate shape and made of conductor such as copper. As described above, the plate shape here also includes a thin film shape such as copper foil. The opposing conductive plate 30 is arranged so as to face the ground plate 10 via the support plate 20. Similar to the ground plate 10, the opposing conductive plate 30 may also have a pattern formed on the surface of a resin plate such as a printed wiring board. In addition, in the present disclosure, “parallel” is not limited to a completely-parallel state. The opposing conductive plate 30 may be inclined from several degrees to about 30 degrees with respect to the ground plate 10. That is, the term “parallel” includes a substantially parallel state. The expression “vertical” in the present disclosure is not limited to a completely vertical state, but may be inclined about 30 degrees.

By arranging the opposing conductive plate 30 and the ground plate 10 so as to face each other, a capacitance is formed according to the area of the opposing conductive plate 30 and the distance between the opposing conductive plate 30 and the ground plate 10. The opposing conductive plate 30 is formed to have a size that forms a capacitance that resonates in parallel with the inductance of the short-circuit portion 40 at the operating frequency. The area of the opposing conductive plate 30 may be appropriately designed so as to provide the desired capacitance. The desired capacitance is the capacitance that operates at the operating frequency in cooperation with the inductance of short-circuit portion 40. When f is the operating frequency, L is the inductance of the short-circuit portion 40, and C is the capacitance formed between the opposing conductive plate 30 and the ground plate 10, then a relational expression of $f=1/\{2\pi\sqrt{(LC)}\}$ is established. A person skilled in the art can determine an appropriate area of the opposing conductive plate 30 based on the relational expression.

In FIG. 1, the planar shape of the opposing conductive plate 30 is rectangular. That is, the shape of the opposing conductive plate 30 is similar to the planar shape of the ground plate 10. The long and short sides of opposing conductive plate 30 are parallel to the long and short sides of ground plate 10, respectively. However, the planar shape of the opposing conductive plate 30 may be circular, square, regular octagon, regular hexagon, or the like. The opposing conductive plate 13 may be provided with slits or may have rounded corners.

Figure 2:
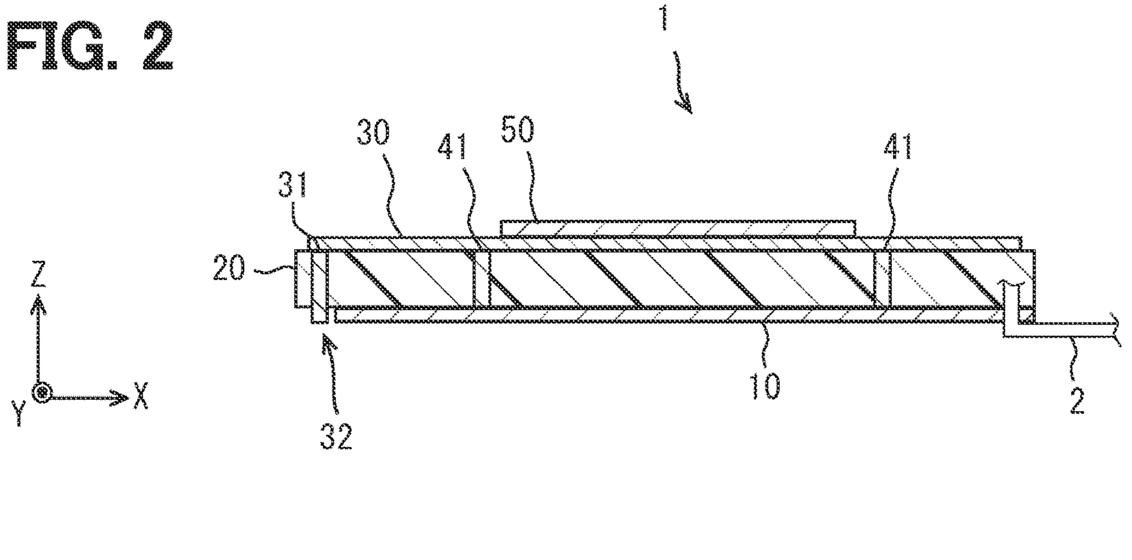
FIG. 2 is a cross-sectional view taken along line II-II shown in FIG. 1.

A power supply point 31 is formed at an arbitrary position on the opposing conductive plate 30. The power supply point 31 is an end of a power supply pin 32 on the opposing conductive plate 30 side, as shown in FIG. 2. A coaxial cable is connected to the opposite end of the power supply pin 32. Therefore, the power supply pin 32 electrically connects the opposing conductive plate 30 and the coaxial cable. In FIG. 1, the power supply point 31 is provided near a midpoint of one short side of the opposing conductive plate 30. However, the power supply point 31 can be arranged at any position as long as it can match the impedance with the power supply line.

As a power supply method to the opposing conductive plate 30, various methods such as a direct connection power supply method and an electromagnetic coupling method can be adopted. The direct connection power supply method refers to a method in which the power supply line and the opposing conductive plate 30 are directly connected. The electromagnetic coupling method refers to a power supply method using electromagnetic coupling between a microstrip line or the like for power supply and the opposing conductive plate 30.

Moreover, as shown in FIG. 2, the tip of the cable 2 is connected to the end of the antenna device 1. The cable 2 is connected to a signal line such as a pattern line provided inside the antenna device 1. For example, by making the support plate 20 have a multi-layered structure, the signal line can be formed on the support plate 20 at positions in the thickness direction different from those of the ground plate 10 and the opposing conductive plate 30.

The short-circuit portion 40 electrically connects the ground plate 10 and the opposing conductive plate 30. The short-circuit portion 40 of the present embodiment has a configuration including a plurality of short-circuit pins 41. In FIG. 1, only some of the short-circuit pins 41 are denoted by reference numerals for convenience of illustration.

The short-circuit pin 41 is a conductive member, one end of which is connected to the ground plate 10 and the other end of which is connected to the opposing conductive plate 30, as shown in FIG. 2. The plurality of short-circuit pins 41 have the same shape and size as each other. Each short-circuit pin 41 is provided perpendicular to the opposing conductive plate 30 and the ground plate 10. By adjusting the diameter and length of the plurality of the short-circuit pins 41, the inductance provided in the short-circuit portion 40 can be adjusted.

The short-circuit pin 41 may be a hollow member, and when the antenna device 1 is realized using a printed wiring board as a base material, a via provided in the printed wiring board can be used as the short-circuit pin 41.

Portions of the plurality of short-circuit pins 41 that are connected to the opposing conductive plate 30 are located on a perimeter 42 of one rectangular. In other words, connecting a plurality of portions where a plurality of short-circuit pins 41 are short-circuited with the opposing conductive plate 30 forms a circular shape.

The rectangular perimeter 42 is arranged so that its center is near the center of the opposing conductive plate 30. A size of the rectangular perimeter 42 can be determined from the inductance required for the short-circuit portion 40. Also, the size of the rectangular perimeter 42 may be determined from the area required for the circuit 50 arranged in the area surrounded by the perimeter 42 of the opposing conductive plate 30.

The distances between the short-circuit pins 41 are such that the current whose amplitude fluctuates at the operating frequency hardly passes between the short-circuit pins 41. In order to ensure that very little current, whose amplitude fluctuates at the operating frequency, passes between the short-circuit pins 41, the plurality of short-circuit pins 41 are spaced sufficiently narrowly relative to the operating wavelength.

In the opposing conductive plate 30, the circuit 50 is arranged in the area surrounded by the perimeter 42, that is, the area surrounded by portions short-circuited by the short-circuit pins 41. The circuit 50 is, for example, a transmission/reception circuit. The transmission/reception circuit is a circuit module that performs at least one of modulation, demodulation, frequency conversion, amplification, digital-to-analog conversion, and detection. The circuit 50 operates using the opposing conductive plate 30 as a circuit ground. A portion of the circuit 50 is connected to the opposing conductive plate 30 that functions as a circuit ground. Also, the circuit 50 is connected to the cable 2 via a pattern line or the like provided inside the support plate 20.

[Operation of Antenna Device 1]

The operation of the antenna device 1 having the structure described above will be described. The opposing conductive plate 30 is short-circuited to the ground plate 10 by a short-circuit portion 40 provided in the central region of the opposing conductive plate 30, and the area of the opposing conductive plate 30 is equal to an area for forming an electrostatic capacitance that resonates in parallel with the inductance of the short-circuit portion 40 at the operating frequency.

Therefore, when a high-frequency signal is input from the power supply point 31, LC parallel resonance occurs due to energy exchange between the inductance and the electrostatic capacitance. For LC parallel resonance at the operating frequency, the length of the short-circuit portion 40 may be shorter than the length for primary resonance. This LC parallel resonance is the 0th-order resonance. When the LC parallel resonance occurs, an electric field perpendicular to the ground plate 10 and the opposing conductor plate 30 is generated between the ground plate 10 and the opposing conductive plate 30. This vertical electric field propagates from the short-circuit portion 40 toward the edge of the opposing conductive plate 30, and at the edge of the opposing conductive plate 30, the vertical electric field becomes a linearly polarized wave (i.e., ground plate vertically polarized wave) having a polarization plane perpendicular to the ground plate 10 and propagates in space. The ground plate vertically polarized wave here refers to a radio wave in which the vibration direction of the electric field is perpendicular to the ground plate 10 and the opposing conductive plate 30.

Further, the antenna device 1 has directivity in the horizontal direction of the antenna at the operating frequency. When the ground plate 10 is disposed so as to be horizontal, the antenna device 1 functions as an antenna having a main beam in the horizontal direction. The horizontal direction of the antenna here refers to a direction from the center of the opposing conductive plate 30 toward the edge thereof. According to another viewpoint, the antenna horizontal direction refers to a direction perpendicular to a perpendicular line to the ground plate 10 passing through the center of the opposing conductive plate 30. The antenna horizontal direction corresponds to a lateral direction (e.g., the side direction) of the antenna device 1.

The operation of the antenna device 1 when transmitting radio waves and the operation of the antenna device 1 when receiving radio waves are mutually reversible. That is, according to the antenna device 1, it is possible to receive the ground plate vertically polarized wave coming from the horizontal direction of the antenna.

[Potential of Area Surrounded by Perimeter 42]

As can be seen from the fact that the propagation direction of the above-described vertical electric field is the direction from the short circuit portion 40 to the edge of the opposing conductive plate 30, the current that has flowed from the opposing conductive plate 30 through the short-circuit portion 40 to the ground plate 10 due to the LC parallel resonance flows from the short-circuit portion 40 to both sides of the ground plate 10 in the longitudinal direction. Therefore, in the opposing conductive plate 30, current flows in the direction from the edge of the opposing conductive plate 30 toward the short-circuit portion 40.

However, the short circuit portion 40 is specifically a plurality of short circuit pins 41. The distance between the short-circuit pins 41 adjacent to each other is such that the current flowing through the opposing conductive plate 30 during LC parallel resonance hardly passes between the short-circuit pins 41. Therefore, almost no current flows inside the area surrounded by the perimeter 42 in the opposing conductive plate 30.

Figure 3:
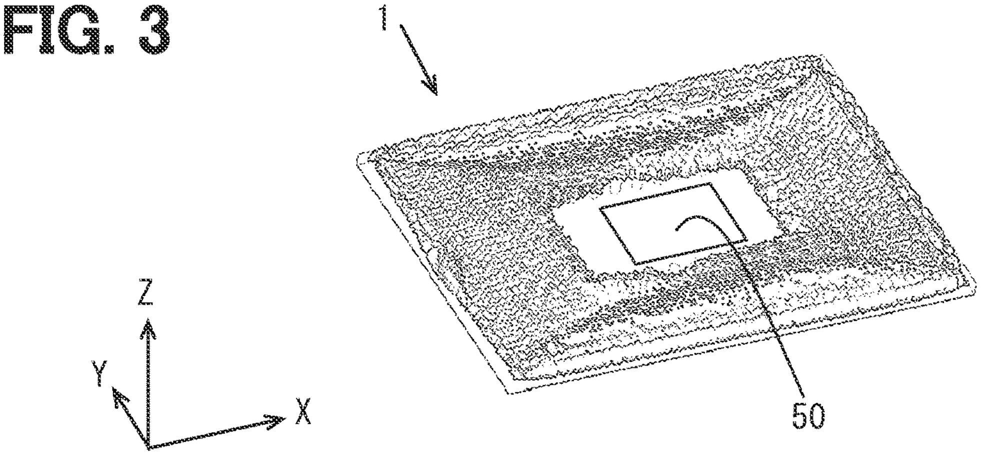
FIG. 3 is a diagram showing magnitudes of electric field vectors generated in the antenna device 1.

FIG. 3 is a diagram showing the result of simulating the magnitude of the electric field vector generated in the antenna device 1 during LC parallel resonance. It can also be seen from FIG. 3 that almost no current flows inside the area surrounded by the perimeter 42 during LC parallel resonance. Therefore, in the opposing conductive plate 30, the inside of the area surrounded by the perimeter 42 can be used as a ground.

Therefore, in the present embodiment, the circuit 50 is arranged in the area surrounded by the perimeter 42 on the opposing conductive plate 30. Since the opposing conductive plate 30 is used as the ground of the circuit 50, it is not necessary to expand the ground plate 10 in a direction not facing the opposing conductive plate 30 in order to arrange the circuit 50.

Therefore, it is possible to prevent the length of the portion of the ground plate 10 through which current flows from becoming close to the length that resonates at the operating frequency. As a result, no strip line is required to suppress leakage current from the ground plate 10.

Second Embodiment

Figure 4:
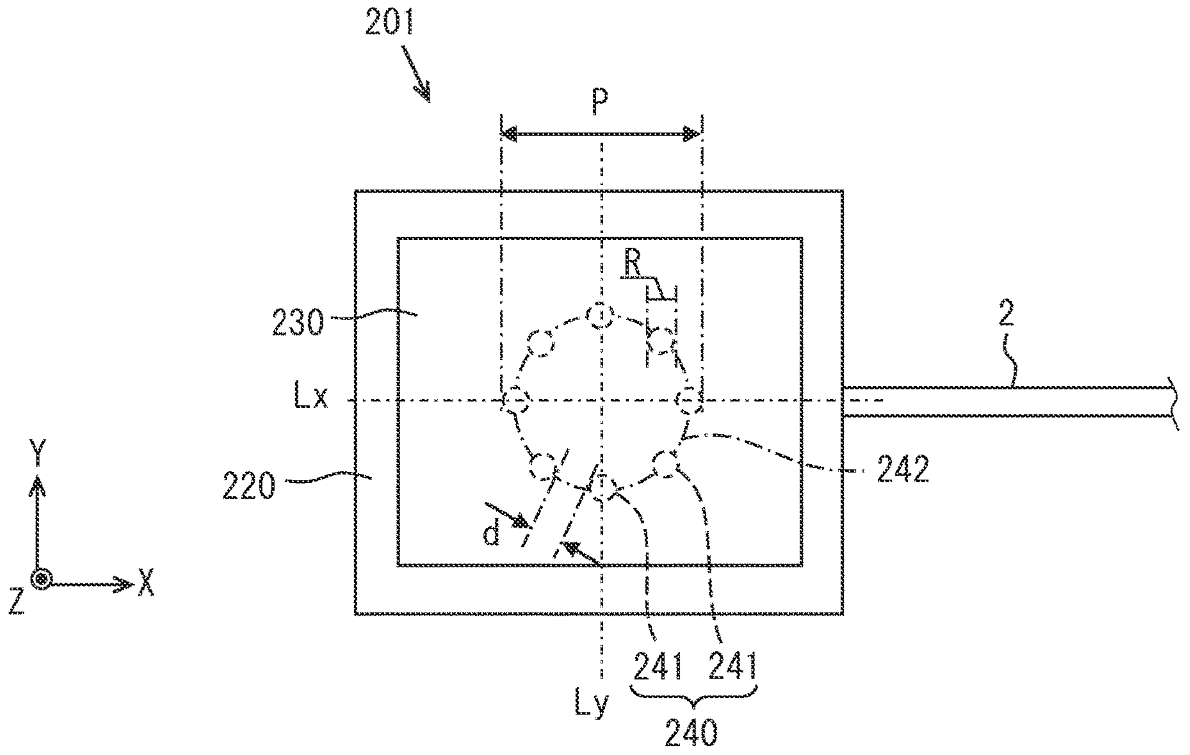
FIG. 4 is a plan view of an antenna device according to a second embodiment.
Figure 5:
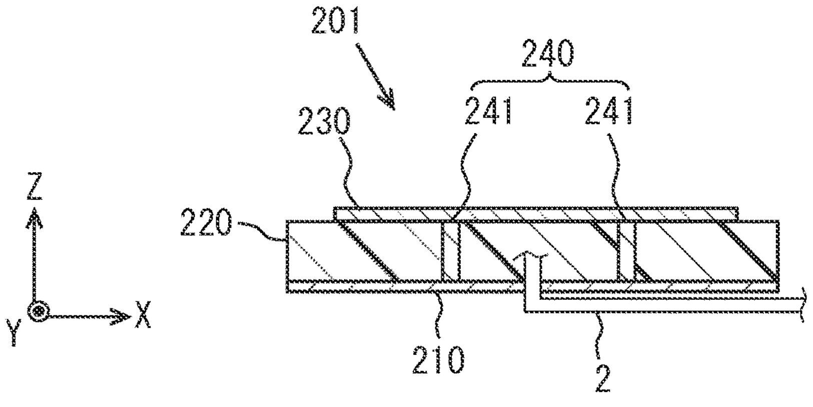
FIG. 5 is a cross-sectional view of the antenna device.

Next, a second embodiment will be described. FIG. 4 shows a plan view of the antenna device 201 of the second embodiment, and FIG. 5 shows a cross-sectional view of the antenna device 201 taken along a plane parallel to the XZ plane through a straight line Lx. Although the antenna device 201 includes a circuit 50 like the antenna device 1, the circuit is omitted in FIGS. 4 and 5.

The straight line Lx is a line parallel to the X-axis and passing through a center of the opposing conductive plate 230. A straight line Ly is a line parallel to the Y-axis and passing through the center of the opposing conductive plate 230. Therefore, an intersection of straight lines Lx and Ly is the center of opposing conductive plate 230.

The support plate 220 and the opposing conductive plate 230 included in the antenna device 201 are square in plan view. Further, the short-circuit portion 240 has a configuration in which a plurality of short-circuit pins 241 are arranged at positions passing on the perimeter 242. As in FIG. 1, only some of the short-circuit pins 241 are labeled for convenience of illustration. As shown in FIG. 5, a ground plate 210 is formed below the support plate 220. The plane view shape of the ground plate 210 is the same as that of the support plate 220.

The tip of the cable 2 is connected to the antenna device 201 in an area surrounded by a short-circuit portion 240, that is, a portion where a plurality of short-circuit pins 241 are short-circuited to the opposing conductive plate 230 and the ground plate 210. Almost no current flows in the area surrounded by the short-circuited part of the short-circuit portion 240. Therefore, the leakage current to the cable 2 can be particularly suppressed by connecting the cable 2 to the area surrounded by the short-circuited part of the short-circuit portion 240.

The diameter R of the short-circuit pin 241 is 0.4 mm, and the height of the short-circuit pin 241 is 1.6 mm. Also, the length of P shown in FIG. 4, that is, the diameter of the circle circumscribing the plurality of short-circuit pins 241 arranged on the perimeter 242 is 4 mm.

Figure 6:
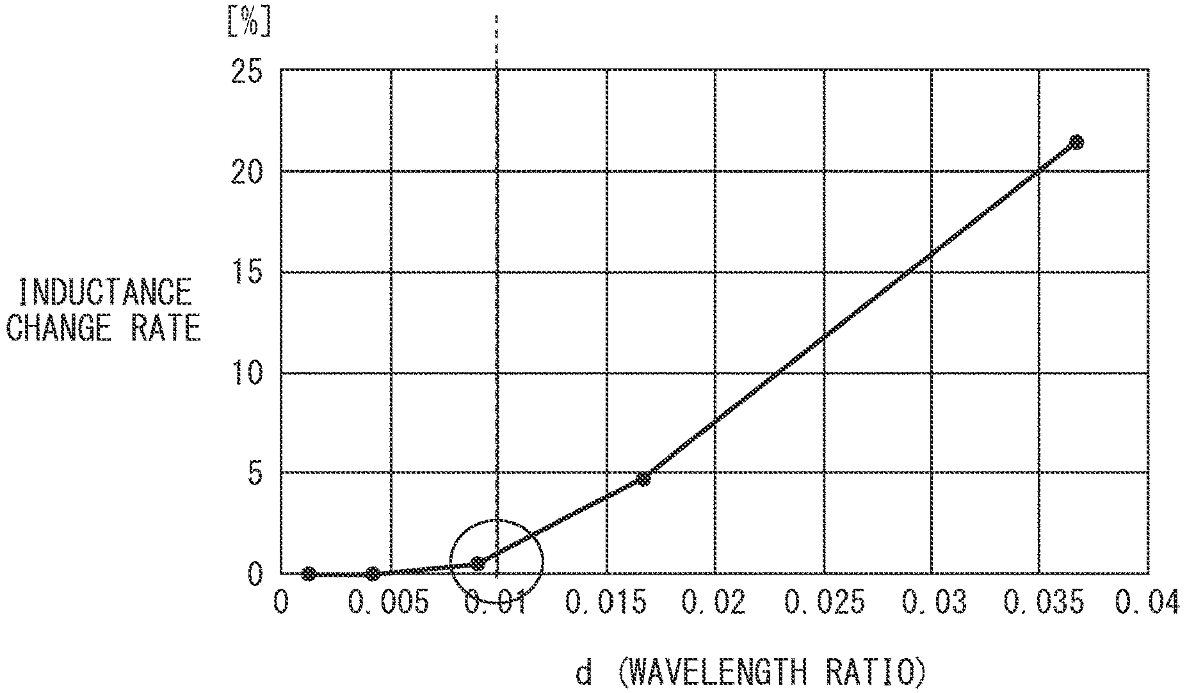
FIG. 6 is a diagram showing a relationship between a length between adjacent short-circuit pins and an inductance change rate.

FIG. 6 shows the inductance change rate when the length d between adjacent short-circuit pins 241 in the antenna device 201 is changed. In FIG. 6, the horizontal axis is the length between adjacent short-circuit pins 241 in wavelength ratio. The vertical axis shows the inductance change rate. The inductance change rate is the rate of change in inductance based on the inductance when the short-circuit portion 240 is a single large short-circuit pin. The short-circuit portion 240, assuming a single large short-circuit pin, is a single pin with the diameter of 4 mm and the height of 1.6 mm. The inductance of one pin with the diameter of 4 mm and the height of 1.6 mm is 0.42 nH.

As can be seen from FIG. 6, when the length d between the adjacent short-circuit pins 241 is 0.01 or less in wavelength ratio, the inductance is equivalent to that when the short-circuit portion 240 is a single large pin. In the case of a single short pin, current flows on the surface and little current flows internally. Therefore, the fact that the inductance is equivalent to that when the short-circuit portion 240 is a single large pin indicates that almost no current flows in the area surrounded by the multiple short-circuit pins 241.

From the results of FIG. 6, the length d between adjacent short-circuit pins 241, that is, the distance between short-circuit pins 241 and adjacent short-circuit pins 241 is preferably 0.01 wavelength or less.

Third Embodiment

Figure 7:
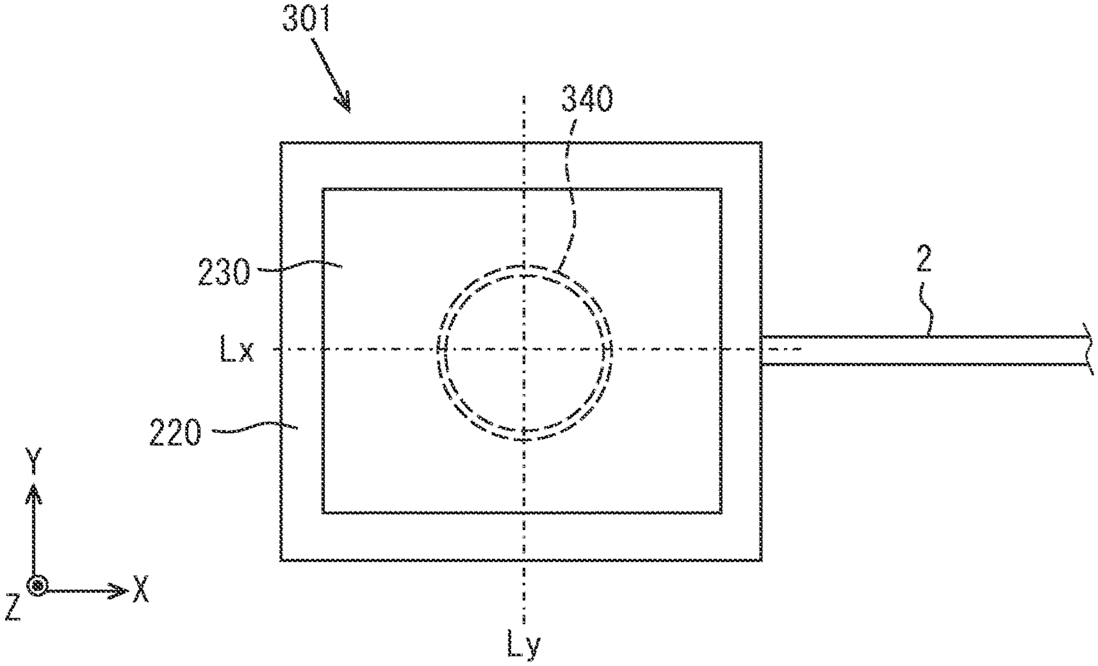
FIG. 7 is a plan view of an antenna device according to a third embodiment.

FIG. 7 shows a plan view of the antenna device 301 of the third embodiment. Although the antenna device 301 also includes the circuit 50, it is omitted in FIG. 7. The antenna device 301 includes one cylindrical short-circuit pin 340 as a short-circuit portion.

One cylindrical short-circuit pin 340 can also be considered to have a configuration in which the length d between adjacent short-circuit pins is zero. Therefore, little current flows through the area surrounded by the short-circuit pin 340.

Although the embodiments have been described above, the disclosed technology is not limited to the above-described embodiment, and the following modifications are included in the present disclosure, and various modifications can be made without departing from the spirit of the present disclosure.

<Modification 1>

In the opposing conductive plates 30 and 230, the shape of the short-circuited parts of the short-circuit portions 40 and 240 is not limited to the rectangular and circular shapes exemplified in the embodiments. The shape of the part where the short-circuit portions 40 and 240 are short-circuited can be various shapes such as a square and an ellipse.

What is claimed is:

1. An antenna device, comprising:
a ground plate made of a conductor with a flat plate shape;
an opposing conductive plate made of another conductor with a flat plate shape, arranged to space apart from the ground plate by a predetermined distance, and electrically connected to a power supply line; and
a short-circuit portion arranged in a central region of the opposing conductive plate and electrically connecting the opposing conductive plate and the ground plate, wherein
a frequency at which an inductance of the short-circuit portion and a capacitance formed by the ground plate and the opposing conductive plate resonate in parallel is defined as an operating frequency,
the short-circuit portion has a circumferential portion that is short-circuited with the opposing conductive plate, and
a circuit is arranged in an area surrounded by a short-circuited part of the short-circuit portion of the opposing conductive plate.

2. The antenna device according to claim 1, wherein
a cable is connected to an area surrounded by the part where the short-circuit portion is short-circuited.

3. The antenna device according to claim 1, wherein
The short-circuit portion includes a plurality of short-circuit pins for electrically connecting the opposing conductive plate and the ground plate, and portions where the plurality of short-circuit pins are connected to the opposing conductive plate is arranged on one perimeter.

4. The antenna device according to claim 3, wherein
the plurality of short-circuit pins are spaced apart from adjacent short-circuit pins by 0.01 times or less of a wavelength corresponding to the operating frequency.

5. The antenna device according to claim 3, wherein
the plurality of short-circuit pins are arranged on one rectangular perimeter.

6. The antenna device according to claim 3, wherein
the plurality of short-circuit pins are arranged on one circumference.

7. The antenna device according to claim 1, wherein
the short-circuit portion is one cylindrical short-circuit pin.

* * * * *